Dec. 11, 1951  G. GUANELLA  2,578,241
RADIO RECEIVER FOR USE ON AIRCRAFT
IN THE FIELD OF A ROTATING BEAM
Filed Feb. 21, 1950  2 SHEETS—SHEET 1
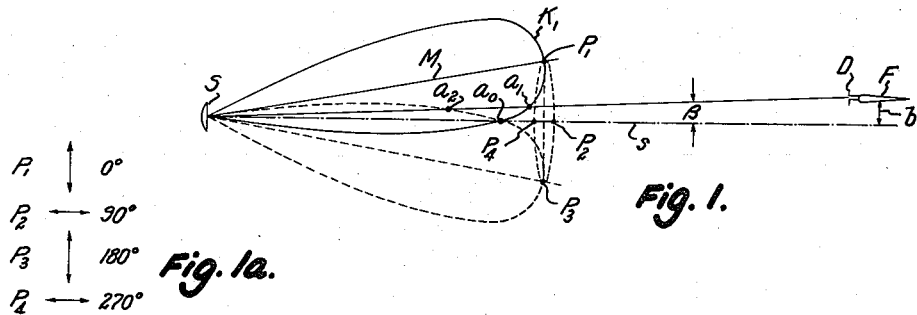
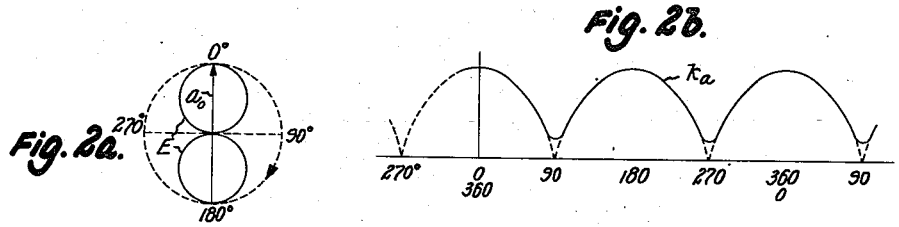
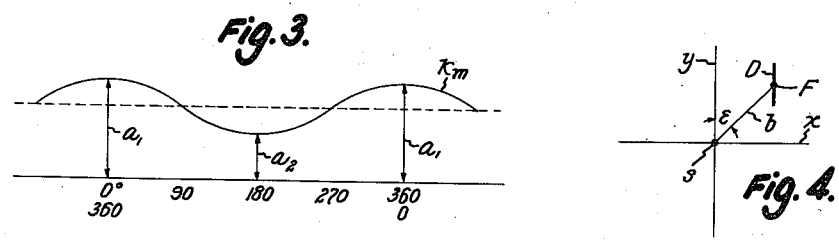
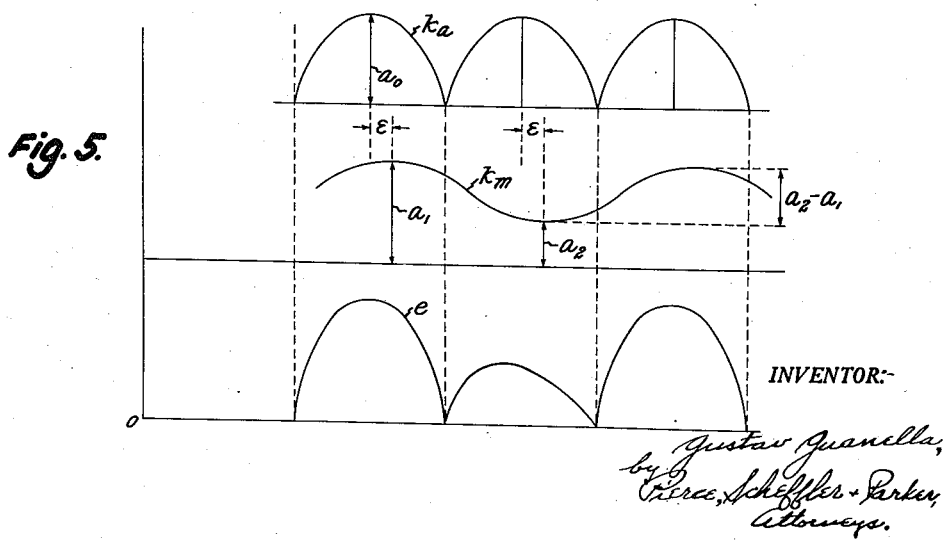
INVENTOR:-
Gustav Guanella
by Pierce, Scheffler & Parker
Attorneys.

Dec. 11, 1951  G. GUANELLA  2,578,241
RADIO RECEIVER FOR USE ON AIRCRAFT
IN THE FIELD OF A ROTATING BEAM
Filed Feb. 21, 1950  2 SHEETS—SHEET 2
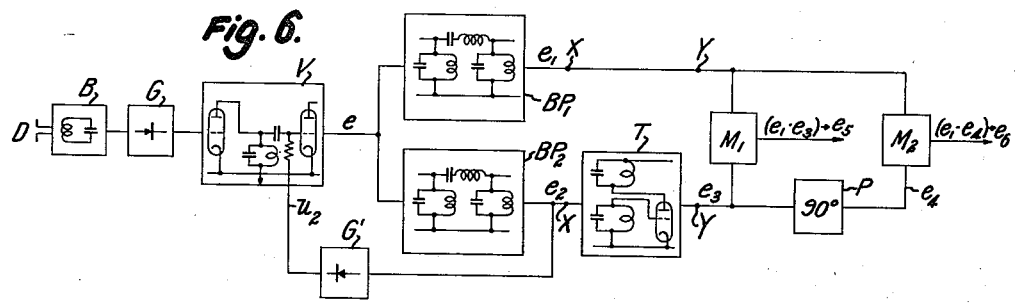
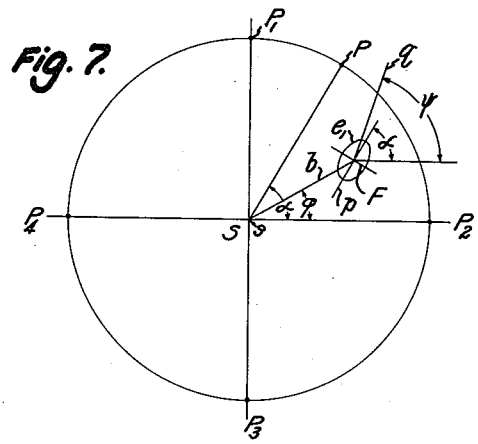
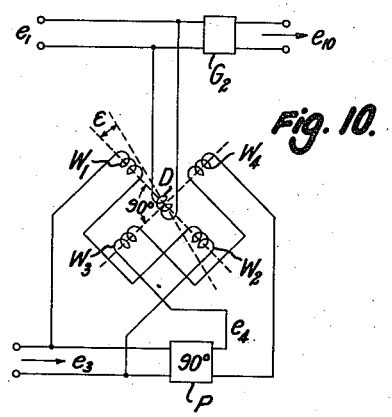
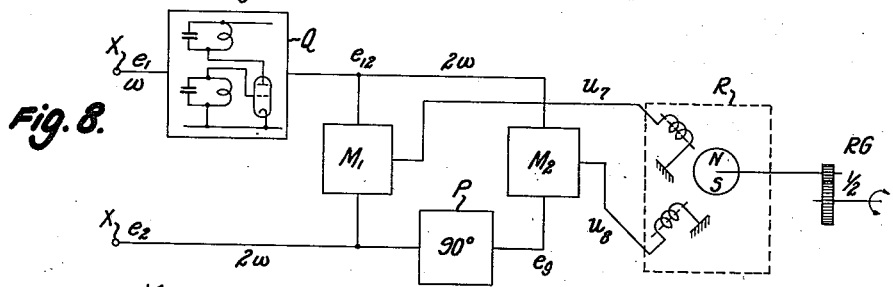
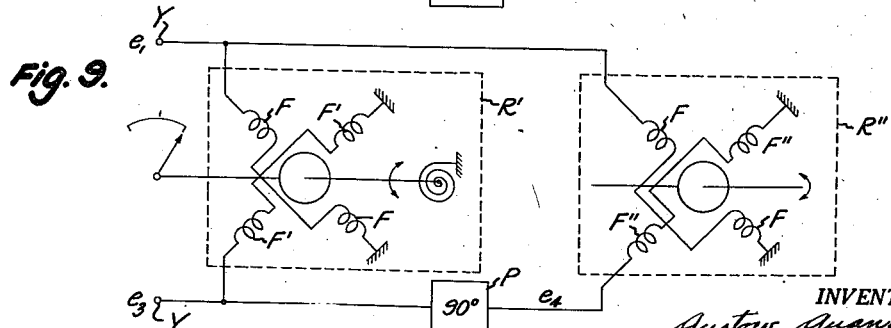
INVENTOR:-
Gustav Guanella,
BY
Pierce, Scheffler & Parker,
Attorneys.

Patented Dec. 11, 1951

2,578,241

UNITED STATES PATENT OFFICE 2,578,241

RADIO RECEIVER FOR USE ON AIRCRAFT IN THE FIELD OF A ROTATING BEAM

Gustav Guanella, Zurich, Switzerland, assignor to Patelhold Patentverwertungs- & Elektro-Holding A.-G., Glarus, Switzerland Application February 21, 1950, Serial No. 145,424
In Switzerland February 25, 1949

11 Claims. (Cl. 343—101)

This invention relates to radio receivers for use on aircraft, such as automatically guided projectiles and airplanes, in the field established by a rotating beam, and more particularly to receivers for developing electrical quantities which are significant of the position of the aircraft with respect to the axis of rotation of the beam. The electrical quantities may be impressed upon electrical instruments or a cathode ray tube to produce visual indications from which the pilot may determine the deviation of the aircraft from a desired flight path, or the electrical quantities may energize control devices to correct the deviation of automatically controlled aircraft from the desired flight path.

The term "rotating beam" is to be understood as meaning a constricted beam of ultra-high frequency radio waves such as emitted from a dipole when its electrical center is displaced along a circular path about the focal point of a parabolic reflector by a cyclic motion imparted to the dipole or the reflector. The beam axis of maximum intensity radiation describes a conical path in space, and the main polarization axis of the radio energy field rotates about the axis of the beam when the transmitter is of the type in which the reflector is stationary and the dipole makes one revolution about its electrical center for each cycle of eccentric travel about the focal point of the reflector. With other types of transmitters, the polarization does not vary with the angular travel of the beam about its axis of rotation and, with such transmitters, the receiver antenna system on the aircraft must have a cyclically varying polarization characteristic to develop a receiver input voltage which is amplitude-modulated at double the rotation frequency. Both the transmitter and the receiver antenna systems may have a cyclically varying polarization characteristic but, for simplicity of explanation, it will be assumed that the transmitter has a rotating dipole which emits a beam of rotating elliptical polarization and that the aircraft receiver antenna is a non-rotating dipole.

The reflector is so adjusted that its axis, or the mean position of its axis when the reflector is oscillated to develop the beam displacement, coincides with the desired flight path in the region of the instantaneous position of the aircraft on which the receiver is located, and the reflector is to be adjusted either continuously or by steps in accordance with distance of the aircraft from the transmitter as measured by radar or as estimated from an assumed speed of the aircraft. So far as the present invention is concerned, it is assumed that the axis about which the beam rotates does coincide with the desired flight path in the vicinity of the aircraft which carries the receiver.

Objects of the invention are to provide radio receivers for use on an aircraft in the field of a rotating beam, the receivers developing electrical values significant of the deviation of the aircraft from the axis of rotation of the beam. Objects are to provide radio receivers for the purpose stated for developing an electrical voltage which varies with the orientation of the aircraft with respect to the desired flight path, and an electrical voltage which varies with the displacement of the aircraft from the flight path. An object is to provide a radio receiver having a dipole antenna which develops, when in the field of a rotating radio beam, a voltage which varies with the phase relation of the transmitter dipole and the receiver dipole, and a second voltage which varies with the radial displacement of the receiver from the axis of rotation of the beam.

These and other objects and the advantages of the invention will be apparent from the following specification when taken with the accompanying drawings in which:

Fig. 1 is a schematic view showing the flight path about which the beam is rotated, the distribution of the beam intensity at diametrically opposite positions of the rotating beam, and an aircraft spaced from the rotational axis which coincides with a desired path in the region of the aircraft;

Fig. 1a is tabulation showing the location of the main polarization axis of the radiated beam at different positions of the beam as it is rotated counterclockwise about the transmitter axis or guide path;

Fig. 2a is a schematic view or diagram on a plane transverse to the guide path, indicating the polarization of the receiver dipole;

Fig. 2b is a chart or time-amplitude curve showing the variation of the receiver input at double the rotation frequency, with the rotation of the transmitter dipole with respect to a receiver dipole located on the flight path;

Fig. 3 is a chart or time-amplitude curve showing the amplitude modulation, at the rotation frequency, of the receiver input when the aircraft is displaced from the desired flight path;

Fig. 4 is a diagram, on a plane transverse to the guide axis or desired flight path, showing an angular deviation of the receiver dipole from a line connecting the same to the axis of beam rotation;

Fig. 5 is a curve sheet illustrating, on a time or rotation basis, variations in received signal amplitude due respectively to rotation of the polarization of the beam and to displacement of the receiver from the axis of rotation, also the overall variation of the received signal amplitude due to both sources of amplitude variation;

Fig. 6 is a fragmentary circuit diagram of a radio receiver embodying the invention;

Fig. 7 is a diagram, on a plane normal to the rotational axis, for purpose of explanation; and Figs. 8, 9 and 10 are fragmentary diagrams of alternative circuits for incorporation in the radio receiver.

In Fig. 1 of the drawings, the solid line curve $K_1$ is the radiation diagram of a directional radio energy beam emitted from a transmitter S which includes conventional means for rotating the beam about and at a predetermined small angle to the guide axis $s$ which coincides with the desired flight path of an aircraft F on which there is a dipole D and receiver for developing voltages significant of the departure $b$ of the aircraft from the desired flight path. The axis M of maximum beam intensity moves in a conical path $P_1$—$P_4$ about the guide axis $s$ and, after a half-rotation, the radiation diagram of the beam is indicated by the dotted line curve $K_3$. The direction of polarization of the beam rotates with the displacement of the beam about the guide axis $s$, as is indicated by the table, Fig. 1a, in which the arrows show the direction of polarization for the several positions $P_1$—$P_4$ of the beam axis.

If the object F in flight, and thus the receiver dipole D, is located on the guide axis $s$, the field intensity at the dipole is not affected by rotation of the beam but remains constant at the value $a_0$, Fig. 1. Since the receiver dipole D, whose radiation characteristic is shown by curve E of Fig. 2a, maintains its position substantially unchanged during at least the short period of one rotation of the radar beam, and the polarization of the beam rotates comparatively rapidly (for example at a frequency of 100 cycles per second in comparison with a possible rotation of a dipole D on a guided missile at a frequency of one cycle per second), the received signal potential $a_0$ varies between zero or a minimum value and a maximum value twice per revolution of the transmitted beam as indicated by curve $k_a$ of Fig. 2b. With a simple polarized transmission radiation, the received signal voltage falls to zero, as indicated by the dotted line sections of the curve but, as is advantageous, it is preferable to employ elliptically polarized waves which do not develop zero voltages but minimums as shown by the solid line curve $k_a$. If the receiver dipole D is displaced from the guide axis $s$ by a distance $b$, so that the line $sD$ from the guide axis to the receiver is at an angle $\beta$ to the guide axis $s$, the field strength at the receiver varies between values $a_1$ and $a_2$, in synchronism with the beam rotation, according to the amplitude curve $k_m$ of Fig. 3. This variation takes place at the rotational frequency of the beam and, upon deviation of the aircraft F from the guide axis $s$, the signal voltage developed at the dipole D varies at the frequency of beam rotation according to curve $k_m$ of Fig. 3 and at twice the frequency of beam rotation according to curve $k_a$ of Fig. 2b. If the deviation of the aircraft F is not in the plane through the axis of the dipole D and the guide axis $s$ as shown in Fig. 1, there is a phase displacement $\epsilon$ between the received voltage components $k_a$ and $k_m$. This condition is schematically shown in Fig. 4 in which the position of the dipole axis with respect to the guide axis $s$ is indicated on a plane through the axis of the receiver dipole D and perpendicular to the guide axis $s$, the axis $x$, $y$ of the coordinated system being respectively normal to and parallel to the axis of the dipole D. The position of the flying object F is determined on this coordinate system by the length $b$ of a line $sF$ from the guide axis $s$ to the object F, and the angle $\epsilon$ between line $sF$ and a reference line, for example axis $y$.

The problem which is solved by this invention is the production of two electrical quantities which vary with and are proportional to the distance $b$ and the angle $\epsilon$. The factors or quantities from which these indicating or control values may be developed are the received voltage components $k_a$ and $k_m$ which are displaced by a phase angle $\epsilon$, as shown in Fig. 5, and the overall received voltage $e$, Fig. 5, which varies as a multiplication of the instantaneous values of the components $k_a$ and $k_m$. The invention comprises a receiver system on the aircraft or flying object F comprising a dipole rigidly mounted on the aircraft or object F, a receiver including a rectifier for demodulating the received signal, a filter system for separating voltage components of the frequency of and double the frequency of rotation of the beam, a gain control system for maintaining the voltage component of double the beam rotation frequency at least approximately constant, and voltage developing means responsive respectively to the amplitude of the voltage components of beam rotation frequency and to the phase displacement of the received voltage components.

A receiver embodying the invention is shown schematically in Fig. 6. The signal input at the receiver dipole D is transmitted through a filter B, which may be a cavity resonator, to a rectifier G which works into an amplifier V to develop an output voltage $e$ of the character shown by curve $e$ of Fig. 5. The amplifier output is impressed in parallel upon two band-pass filters $BP_1$ and $BP_2$; the pass frequency of filter $BP_1$ being selected or adjusted to pass a voltage component $e_1$ of the beam rotation frequency $\omega$ and to block transmission of double the rotation frequency. The band-pass filter $BP_2$ transmits a voltage component $e_2$ of frequency $2\omega$, double that of the beam rotation frequency, and blocks transmission of the components of the beam rotation frequency $\omega$. The output voltage $e_2$ of frequency $2\omega$ is impressed upon a frequency divider T which develops an output voltage $e_3$ of the beam rotation frequency $\omega$. The output voltage $e_2$ is also impressed upon a rectifier G' to develop a gain control voltage $u_2$ which is applied to the amplifier V to maintain its output voltage $e$, and therefore the component $e_2$ of double beam rotation frequency, at least approximately constant, i. e. substantially independent of the distance of the flying object F from the transmitter.

The voltage component $e_1$ is impressed upon ring modulators $M_1$ and $M_2$, and voltage component $e_3$ is impressed on modulators $M_1$ and on a phase shifter P which develops an output voltage $e_4$ which is impressed upon the ring modulator $M_2$. Since voltages $e_1$, $e_3$, and $e_4$ are of the same frequency, the outputs $e_5$ and $e_6$ of modulators $M_1$ and $M_2$ are direct current voltages which vary in magnitude with the voltage $e_1$ and vary in algebraic sign with the phase angle $\epsilon$ between voltage components $e_1$ and $e_3$. These direct current voltages $e_5$ and $e_6$ may be employed to energize indicating and/or control devices on a piloted aircraft or to energize control devices on a rocket or missile. A condition for satisfactory operation is that the voltages $e_1$ and $e_3$ be in correct phase position with each other according to the orientation of the receiver dipole D with respect to a preselected zero position of the axis of the radiated beam, see Fig. 4. This condition is established by placing the rocket on the firing platform with the dipole in a preselected plane, and firing the rocket in synchronism with the rotating beam. The control device on a rocket may be, for example, an eccentrically located propulsion jet nozzle, and motor mechanism energized by the control voltages $e_5$ and $e_6$ to adjust the eccentricity of the jet nozzle to develop vertical and/or lateral force components to return an off-course rocket towards the guide axis $s$.

The method of operation of the device is as follows: As soon as the object in flight, for example a rocket F, is located in the field established by the transmitter S, the dipole antenna D receives the polarized waves which are radiated by the transmitter and which rotate at the rotation frequency $\omega$ which may be 100 cycles per second, for example. Moreover, the rocket itself and thereby the dipole antenna can also have a rotation of its own, for instance one rotation per second, which is comparatively small in relation to the rotation frequency of the radar beam. The envelope of the received high frequency oscillations has a rotation- or time-amplitude characteristic according to the curve $e$ of Fig. 5. This voltage curve is produced by multiplication of two components, i. e. the voltage component $k_a$ of the receiving dipole voltage and the voltage component $k_m$. After passage through the band filter B which eliminates foreign disturbing frequencies, there is a demodulation by the receiver G and amplification in amplifier V to develop voltage $e$ which fluctuates according to the curve $e$ of Fig. 5. The voltage component $e_1$ of the rotation frequency $\omega$ is separated by means of the band filter $BP_1$, and the voltage component $e_2$ of double rotation frequency $2\omega$ is taken off through the band filter $BP_2$. The voltage $e_2$ is now divided in half frequency in the frequency divider T to develop an output voltage $e_3$ of the same frequency $\omega$ as voltage $e_1$. The voltages $e_1$ and $e_3$, now brought to the same frequency, can be compared with each other. The original phase deviation $\epsilon$ of the oscillation components received by the dipole is also exhibited by the voltages $e_1$ and $e_3$ at the outputs of the band filter $BP_1$ and the frequency divider T, respectively. For utilizing the two voltages $e_1$ and $e_3$ it is necessary that voltage $e$ at the output of amplifier V be as constant as possible, thus independent of the distance of the receiver from the transmitter. For this purpose, the rectifier G' develops a gain control voltage $u_2$ for application to amplifier V by rectifying the voltage $e_2$. By this regulation, the voltages $e_1$ and $e_3$ can be kept as nearly constant as is necessary in the interest of a satisfactory control. In the modulators $M_1$ and $M_2$, products $\pm e_1.e_3$ or $\pm e_1.e_4$ respectively are obtained. The voltages $e_3$ and $e_4$ are substantially constant, whereas voltage $e_1$ is dependent on the modulation index $$m = \frac{a_2 - a_1}{a_2 + a_1}$$

(Fig. 3) and thus on the deviation angle $\beta$. According to whether $a_2 \gtreqless a_1$ and therefore whether angle $\beta$ is positive or negative, the modulation products $e_5$ and $e_6$ likewise change their direction. Since $e_5$ and $e_6$ are direct currents, they can be positive, zero or negative. The voltage $e_3$ is supplied directly to modulator $M_1$, whereas voltage $e_4$ which is imposed on the modulator $M_2$ is phase displaced from voltage $e_3$ by 90°. In this way, the two voltages $e_3$ and $e_4$ form a two-phase system. According to the instantaneous angle $\epsilon$, the algebraic signs of the voltages $e_5$ and $e_6$ for control of the flight path are determined. The signs of these control voltages are, for instance for four definite angles $\epsilon$, according to the following table:

| E | $e_5$ | $e_6$ |
|---|---|---|
| 0 | + | 0 |
| 180° | − | 0 |
| 90° | 0 | + |
| 370° | 0 | − |

Instead of a simple polarized transmitting radiation, an elliptically polarized radiation can be used with advantage. With a radiation of this type, there are no angular relations of the dipole D to the rotating field which result in an absolute zero receiver input but, on the contrary, there are only certain minimums in reception as indicated by the solid line curve, Fig. 2b. In this way, the receiver is never without a finite voltage input and the effects of "noise" disturbances are thereby reduced to the minimum. In addition, for the demodulation in rectifier G and for the screening out of the rotation frequency in the band filter $BP_1$, it is of advantage for the input voltage to follow a sine curve as far as possible. This effect can be produced also if the receiving antenna possesses an elliptically polarized receiving diagram. For this purpose, on the object in flight, an additional dipole turned 90° can be used in addition to the regular receiving dipole. This additional dipole is connected to the receiving filter through a 90° phase shifter.

The relative values and relations of the several voltage components can be explained by reference to Fig. 7 and the following equations. The field strength at the rocket or other flying object F varies periodically between the limiting values $a_1$, $a_2$, see Fig. 3. In Fig. 7 the several pertinent factors or values are shown as projected upon a plane perpendicular to the guide axis $s$ and passing through the object F. The instantaneous position of the beam axis M is indicated by the point P and the instantaneous position angle of this beam axis with respect to a reference line by the angle $\alpha$. The flying object F is displaced from the flight axis $s$ by a distance $b$ which is determined by the angle $\beta$, Fig. 1, and the distance of the object F from the transmitter S. The transmitting oscillation is assumed to be polarized elliptically. Since the polarization rotates in synchronism with the beam, the received oscillation energy at the object F is likewise polarized in agreement with the illustrated elliptical pattern $e_1$. The same result is obtained with linear transmission polarization and elliptically polarized receiving antenna or also with elliptical polarization of both aerials. The main polarization axis $p$ turns around the object F at the constantly changing angle $\alpha = \omega t$. The main receiving antenna D is rigidly joined to the object F and its main axis is indicated by line $q$. It is turned in comparison with the original position by the variable angle $\psi$ according to the rotation of the rocket.

When the receiver lies in the guide-axis ($\beta = 0$ and $b = 0$), then, due to relative rotation of the transmitter antenna main axis and that of the receiver, there is an amplitude modulation of the received signal. The frequency of this modulation is double the rotation frequency, since the amplitude passes through the maximum twice during a rotation of 360°. By rectifying the received oscillation, therefore, a signal $a_0$ is obtained:

$$(a_0 = A(1+n.\cos(2\alpha-2\psi)) = A(1+n\cos(2\omega t-2\psi)) \quad (1)$$

where
$a_0$ = instantaneous amplitude of the rectified or low frequency signal at the guide axis A;
A = mean amplitude of the rectified signal
$n$ = modulation index according to the axes relation in the case of elliptical polarization;
$\alpha = \omega t$ = variable position angle of the rotary high frequency beam (coordinate system fixed in position);
$\omega$ = rotation frequency of the high frequency radar beam;
$\psi$ = position angle of the receiver antenna in relation to a fixed coordinate system at the transmitter, preferably a system with vertical and horizontal axes.

When the receiver is located at a distance $b$ from the guide axis $s$, there is an additional amplitude modulation at the rotation frequency $\omega$ due to cyclic variation in field strength at points spaced from the guide axis, and the instantaneous amplitude $a$ of the rectified signal is:

$$a = a_0(1+m\cos(\alpha-\phi)) = a_0(1+m\cos(\omega t-\phi)) =$$
$$A(1+m\cos(\omega t-\phi) + n\cos(2\omega t-2\psi) +$$
$$\frac{m \cdot n}{2}\cos(\omega t-2\psi+\phi) + \frac{m \cdot n}{2}\cos(3\omega t-2\psi-\phi)) \quad (2)$$

In this equation:
$m$ = modulation index which varies with the distance $b$ from the guide axis;
$\phi$ = position angle of the place of reception in relation to the fixed coordinate system of the transmitter.

This signal is composed of components of different frequencies. The first component $e_1$ of the rotation frequency $\omega$ is:

$$e_1 = E_1\left(m\cos(\omega t-\phi) + \frac{m \cdot n}{2}\cos(\omega t-2\psi+\phi)\right)$$
$$= E_1 m_1 \cdot \cos(\omega t-\phi+\Delta) \quad (3)$$

where $E_1$ is an amplitude factor. Since the modulation degree $n$ is in general smaller than 1, the amplitude of the first quantity prevails. The influence of the second quantity is distinguished by a somewhat changed total amplitude $m_1$ in relation to $m$ and by a phase change to be made in relation to the first member. The difference between $m_1$ and $m$ as well as the additional phase variation $\theta$ are small values which practically are of little influence on the operation of the control.

The second voltage component $e_2$ has double the basic frequency $2\omega$:

$$e_2 = E_2.n.\cos(2\omega t-2\psi) \quad (4)$$

where $E_2$ is an amplitude factor.

These two components $e_1$ and $e_2$ are taken out separately from the low frequency signal by electrical filters, while the third component of frequency $3\omega$ is suppressed.

By frequency transformation in transformer T, the new signal voltage $e_3$ of the rotation frequency $\omega$ is:

$$e_3 = E_3\cos(\omega t-\psi) \quad (5)$$

and voltage $e_4$ which is produced from voltage $e_3$ by a 90° phase shift is:

$$e_4 = E_4'\sin(\omega t-\psi) \quad (6)$$

where $E_3$ and $E_4$ are amplitude factors.

By comparison of phase of the alternating currents $e_1$, $e_3$ mentioned, the phase differences $\epsilon = \phi - \psi - \Delta$ can be determined. This phase difference agrees, except for the small deviation $\theta$, with the position of the guide axis in relation to fixed coordinate system of the rocket. The angle $\epsilon$ therefore determines the sense in which the automatic rocket control devices must be actuated to correct the deviation from the desired flight path. For practical execution, formation of the modulation voltages $e_5$ and $e_6$ is advisable:

$$e_5 = k_5.e_1.e_3 \quad (7)$$
$$e_6 = k_6.e_1.e_4 \quad (8)$$

where $k_5$ and $k_6$ are constants. These modulation products contain direct current voltage components $u_5$, $u_6$ of the following values:

$$u_5 = U_5.m_1.\cos(\psi-\phi-\Delta) \quad (9)$$
$$u_6 = U_6.m_1.\sin(\psi-\phi-\Delta) \quad (10)$$

where $U_5$ and $U_6$ are amplitude factors. These direct current components actuate indicating or control members acting at right angles to each other, through suitable intermediate mechanism, so that the desired indicating or control action is obtained.

The rotating beam may be transmitted continuously or as a number of keyed pulses per revolution of the beam. The pulse repetition rate must be such that a voltage wave significant of the rotating polarization, i. e. similar to voltage wave $k_a$ of Fig. 5, and as free as possible from harmonics can be developed from the rectified pulses at the output side of the rectifier G. Any distortion of the desired voltage wave decreases with an increase in the number of pulses and, in general, it is advisable to transmit at least four pulses per revolution of the beam. The advantage of pulse transmission is that considerably greater reception levels are obtained with the same or smaller transmitter power.

Another embodiment of the invention is possible by substituting the circuit network shown in Fig. 8 for the portion of the Fig. 6 receiver at the right side of the points X, X. With this revision, the desired frequency equality of the voltage components $e_1$ and $e_2$ is obtained by impressing the voltage component $e_1$ of frequency $\omega$ upon a frequency doubler to develop a voltage component $e_{12}$ of the frequency $2\omega$ of the voltage component $e_2$. Voltage $e_{12}$ is impressed on modulators $M_1$ and $M_2$, voltage $e_2$ is impressed upon modulator $M_1$ and on phase shifter P to develop a voltage $e_9$, phase shifted by 90°, which is impressed upon modulator $M_2$. The direct current output voltages $u_7$, $u_8$ of modulators $M_1$, $M_2$ respectively are supplied to field windings, displaced 90°, of a rotary system R which through a 2:1 reduction gear RG affords an angular displacement of an indicating or control shaft equal to the phase displacement $\epsilon$ of the primary voltage components $$\epsilon = \psi - \phi - \Delta \quad (11)$$

The double frequency voltage $e_{12}$ derived from voltage $e_1$ is:

$$e_{12} = E_{12}.m_1.\cos(2\omega t - 2\phi + 2\Delta) \quad (12)$$

where $E_{12}$ is an amplitude factor.

In this case, the modulation products are produced from voltages $e_{12}$ and $e_2$ or from voltages $e_{12}$ and $e_9$ which are rotated in phase 90° in relation to voltage $e_2$:

$$e_7 = k_7.e_{12}.e_2 \quad (13)$$
$$e_8 = k_8.e_{12}.e_2 \quad (14)$$

where $k_7$ and $k_8$ are constants, $E_{12}$ is an amplitude factor, and $$e_9 = E_9.n. \sin(2\omega t - 2\psi) \quad (15)$$

where $E_9$ is an amplitude factor.

The direct current components of these modulation products are as follows:

$$u_7 = U_7.m_1. \cos(2\phi - 2\psi - 2\Delta) \quad (16)$$
$$u_8 = U_8.m_1. \sin(2\phi - 2\psi - 2\Delta) \quad (17)$$

where $U_7$ and $U_8$ are amplitude factors.

For indication or control by the voltage components $e_1$ and $e_3$ or $e_1$ and $e_4$, two phase rotary systems as shown in Fig. 9 may be employed in place of the modulators $M_1$, $M_2$, and other circuit elements of the Fig. 6 network to the right of the points Y, Y. Voltage $e_1$ is impressed upon field windings F of rotary systems R' and R'', voltage $e_3$ is impressed upon field windings F' of rotary system R' which are at 90° to the windings F, and voltage $e_4$ which is displaced by 90° from voltage $e_3$ by phase shifter P is impressed upon field windings F'' at 90° to the field windings F of rotary system R''.

Another circuit arrangement for developing indicating or control displacements is illustrated in Fig. 10. Two fixed pairs of coils $W_1$, $W_2$ and $W_3$, $W_4$ are arranged symmetrically with respect to an axis of rotation and are circumferentially spaced by 90°. A coil D is supported for free rotation about the axis of the field system, i. e. the coil D, as in the well known phase meter, is not provided with restoring springs. Voltage $e_3$ is impressed upon coils $W_1$ and $W_2$, a voltage $e_4$ displaced 90° from voltage $e_3$ by phase shifter P is impressed upon coils $W_3$ and $W_4$, and voltage $e_1$ is impressed upon the coil D. The moving coil D assumes an angle $\epsilon$ with respect to the axis of coils $W_1$, $W_2$ corresponding to the phase angle between voltages $e_1$ and $e_3$. The moving coil D is coupled mechanically or electrically to a control member which can turn about the longitudinal axis of the rocket or other aircraft. The angular displacement of this control member thus varies with the phase angle $\epsilon$, and the force to be exerted along the line of angular displacement may be controlled for instance by a direct current voltage $e_{10}$ obtained by rectification of voltage $e_1$ by rectifier $G_2$.

The several described forms of the invention indicate that there is considerable latitude in the type or form of the voltage-responsive devices upon which the control voltages are impressed to develop indicating or control displacement significant respectively of the orientation of the flying object with respect to the guide axis, and of the distance of the flying object from the flight path.

I claim:

1. An ultra short wave radio receiver to be carried by a flying object for the reception of a beam having a club-shaped radiation pattern revolving about a guide axis at an angle to the major axis of the radiation pattern and having a polarization axis which rotates at double the beam rotation frequency; said receiver comprising a dipole to be mounted on the flying object, a rectifier for demodulating radio energy received by the dipole, band filters for separating from the demodulated radio energy filtered voltage components of the frequency of and double the frequency of beam rotation, frequency transformer means for converting the voltage component of one frequency to the same frequency as that of the other voltage component, means for developing a control voltage proportional to the filtered voltage component of beam rotation frequency, and means responsive jointly to said voltage components of equal frequency for developing a control voltage proportional to the phase displacement of said equal-frequency voltage components.

2. An ultra short wave radio receiver as recited in claim 1, in combination with an amplifier between said dipole and said rectifier, and automatic gain control means for said amplifier energized by the filtered voltage component of double the beam rotation frequency.

3. An ultra short wave radio receiver as recited in claim 1, wherein said frequency transformer means is a frequency divider following the band filter which passes a voltage component of double the beam rotation frequency.

4. An ultra short wave radio receiver as recited in claim 1, wherein said frequency transformer means is a frequency doubler following the band filter which passes a voltage component of the beam rotation frequency.

5. An ultra short wave radio receiver as recited in claim 1, wherein said means responsive jointly to said voltage components of equal frequency comprises two modulators, means for impressing one voltage component upon both modulators, means for impressing the other voltage component upon one modulator and upon a phase shifter, and means for impressing the output voltage of the phase shifter upon the second modulator.

6. An ultra short wave radio receiver as recited in claim 1, wherein said means responsive jointly to said voltage components of equal frequency comprises two two-phase rotary systems, a phase shifter, means energizing said phase shifter and one phase of one system with the equal frequency voltage component derived from the band filter which passed a voltage component of double the beam rotation frequency, means for energizing one phase of the second system with the voltage output of said phase shifter, and means for energizing the other phase of both systems with the other equal frequency voltage component.

7. An ultra short wave radio receiver as recited in claim 1, wherein said dipole develops a linearly polarized energy wave.

8. An ultra short wave radio receiver as recited in claim 1, wherein said dipole develops an elliptically polarized energy wave.

9. An ultra short wave radio receiver as recited in claim 1, wherein said dipole has an elliptically polarized reception characteristic.

10. An ultra short wave radio receiver as recited in claim 1, wherein said means responsive jointly to said voltage components of equal frequency comprises a stationary field system energized by one equal frequency voltage component, a coil movable angularly in the field established by said field system, and means supplying the other equal frequency voltage component to said movable coil.

11. An ultra short wave radio receiver as recited in claim 10, wherein said field system comprises two field coils angularly displaced by 90°, a phase shifter, means impressing the first equal frequency voltage component upon one field coil and upon the phase shifter, and means impressing the output voltage of the phase shifter upon the other field coil.

GUSTAVE GUANELLA.

No references cited.